United States Patent
Schubert et al.

(10) Patent No.: US 6,464,396 B1
(45) Date of Patent: Oct. 15, 2002

(54) ROLLED-UP PLAIN BEARING BUSH

(75) Inventors: Werner Schubert, Wiesloch; Karl Becker, Leon-Rot, both of (DE)

(73) Assignee: KS Gleitlager GmbH (DE)

( * ) Notice: Subject to any disclaimer, the term of this patent is extended or adjusted under 35 U.S.C. 154(b) by 0 days.

(21) Appl. No.: 09/831,414

(22) PCT Filed: Nov. 9, 1999

(86) PCT No.: PCT/EP99/08570
§ 371 (c)(1),
(2), (4) Date: May 9, 2001

(87) PCT Pub. No.: WO00/28226
PCT Pub. Date: May 18, 2000

(30) Foreign Application Priority Data

Nov. 10, 1998 (DE) .......................... 198 51 759

(51) Int. Cl.$^7$ .............................................. F16C 17/02
(52) U.S. Cl. ...................... 384/273; 384/297; 384/298
(58) Field of Search ................ 384/273, 297, 384/298, 7, 908, 909

(56) References Cited

U.S. PATENT DOCUMENTS 4,624,887 A * 11/1986 Bickle et al. ................. 384/7
5,364,682 A * 11/1994 Tanaka et al. .............. 384/908

FOREIGN PATENT DOCUMENTS

| DE | 15 75 641 | 1/1970 |
| DE | 1575641 | 1/1970 |
| DE | 36 01 568 | 7/1987 |
| DE | 37 36 292 | 5/1989 |
| EP | 0 040 448 | 11/1981 |
| EP | 0 040 448 | 10/1983 |
| EP | 0 193 214 | 9/1986 |
| GB | 1592341 | 7/1981 |
| JP | 61 13025 | 1/1986 |
| JP | 10037953 | 2/1998 |
| JP | 10037963 | 2/1998 |

OTHER PUBLICATIONS

Encyclopedia der technischen Chemie, 4. Aufl., Bd. 20 (1981) Verlag Chemie GmbH, Weinheim, Seite 536.

* cited by examiner

Primary Examiner—Lenard A. Footland
(74) Attorney, Agent, or Firm—Young & Basile, PC

(57) ABSTRACT

The invention relates to a rolled-up plain bearing bush made from a metal/plastic composite plain bearing material whose wall has a thickness of at least 0.75 mm and which can be pressed into an opening of said bearing to form a medium-force fit. The inventive bearing bush also comprises a metal supporting layer and a sliding layer. In order to reduce weight and corrosion, the plain bearing bush is characterized in that the metal supporting layer is made of an aluminum alloy and the sliding layer consists of an expanded aluminum metal alloy section and a mixture of plastic sliding material that is applied to the expanded metal section and in the openings thereof in addition to optionally containing fillers that improve caloric conductibility and tribiological properties and the supporting layer is glued using an additional PFA-layer arranged therebetween.

10 Claims, 2 Drawing Sheets

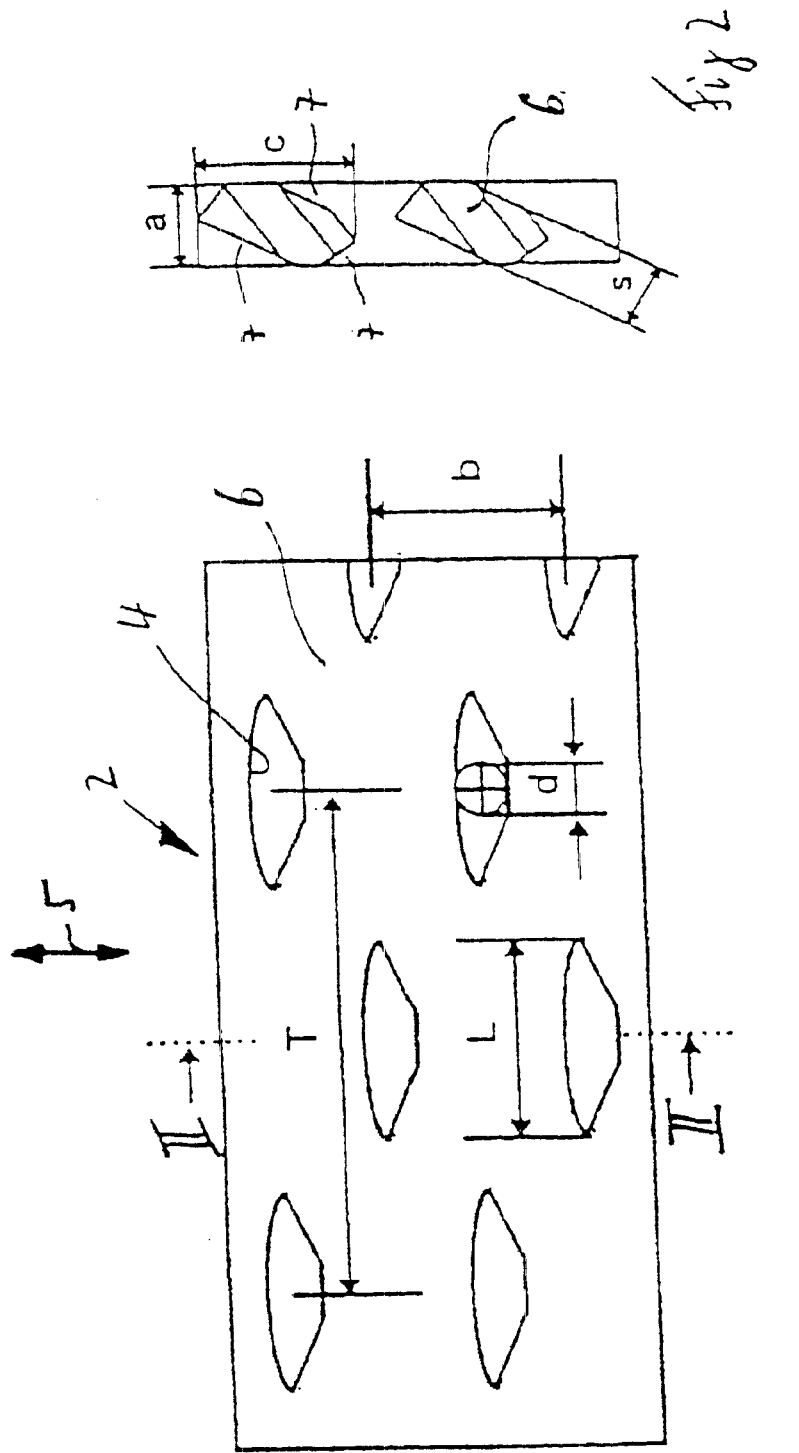

ROLLED-UP PLAIN BEARING BUSH

BACKGROUND

The invention relates to a rolled-up plain bearing bush made of a metal/plastic composite plain bearing material with a wall thickness of at least 0.75 mm, which can be pressed into a bearing opening to create a force fit, with a metallic backing and a sliding surface.

Such bearing bushes are known, for example, from GB 15 92 341 and have been marketed for a long time by the Applicant under the trade name PERMAGLIDE P10. These bearing bushes have a steel backing and a bronze layer sintered porously to it. A mixture consisting of 80 percent PTFE by volume and 20 percent lead by volume is introduced into the porously sintered bronze layer to form the sliding layer, where this sliding layer is thicker than the porous bronze layer and thereby coats it completely.

Rolled bearing bushes produced in this way, the composition of whose sliding layer has been developed in different ways, admirably fulfil the requirements for tribological properties in a plain bearing.

However, it has been shown, particularly in motor vehicle applications and as part of the ongoing efforts to reduce weight in this area, that the weight of a large number of plain bearing bushes has a cumulative negative effect. A further disadvantage of known bushes can be seen in the fact that especially in winter operation, when the motor vehicle is exposed to corrosive media, such as road salt, the steel backing of the plain bearings corrodes.

A generic bearing bush is known from JP-A-61-13025. This bush comprises a steel backing, a thin perforated plate which is completely coated with a binder or adhesive material, which can also contain PFA. A plastic sliding material with fillers is impregnated onto the perforated plate and into the apertures of the perforated plate. The adhesion of the plastic sliding material to the perforated metal is problematic, which is why the binder or adhesive material has to be used. This is expensive.

SUMMARY

The object of the present invention is to avoid the disadvantages described previously, specifically high weight, corrosion and poor adhesion of the plastic sliding material.

This object is achieved by the plain bearing bush described at the beginning, in which the metal backing consists of aluminum alloy and the sliding layer consists of a section of stretched mesh strip made of aluminum alloy and a mixture consisting of a plastic sliding material and necessary fillers to improve thermal conductivity and tribological properties which is introduced on the section of stretched mesh strip and into the apertures of the stretched mesh strip, and wherein the sliding layer and the backing are bonded together by means of an additional layer of PFA located between the sliding layer and the backing.

The plain bearing bush possesses sufficient wall thickness that it can be pressed into a bearing opening to form a force fit and in operation it is seated in the bearing opening such that it cannot shift and/or rotate. The plain bearing bush according to the invention is distinguished by unusually low weight. As a result of the metallic backing being formed from aluminum alloy, preferably high strength, salt-water resistant aluminum alloy, preferably from wrought aluminum alloy, there are no more problems with respect to corrosion of the backing.

Starting with the known steel/plastic composite plain bearing material named at the beginning, it would not have been possible to replace the steel backing layer with an aluminum backing, because aluminum would become fluid at the sintering temperatures for the porous bronze layer.

As a result of the sliding layer comprising a section of an aluminum stretched mesh strip with undercuts in the direction of material thickness, the mixture of plastic sliding material and fillers adheres extremely well, without the need for an adhesion promoter. There are no signs of separation.

A foil-like plain bearing material was already known from EP 0 193 214, consisting of an stretched mesh strip which was coated with a mixture of plastic sliding material and fillers. However, this foil-like plain bearing material was suitable only for manufacturing bushes for relatively low loads and with a thickness of 0.5 mm and less.

The Norton-Pampus Company has already proposed applying a PTFE film to a steel backing. But this does not meet the object underlying the present invention.

With the present invention it was recognized that as the result of the combination of a backing consisting of an aluminum alloy and a sliding layer of the described composition, which are bonded to each other by means of a layer of PFA between them, a plain bearing bush can be produced suitable for creating a force fit, which is also noteworthy for its extremely lightweight and, with regard to evidence of corrosion, proves to be far less problematic than steel/plastic composite bearing materials.

In a preferred embodiment, the plastic-based mixture contains 30 to 90 percent by volume, preferably 40 to 80 percent by volume, PTFE as the plastic sliding material. In addition to PTFE, additional plastic components, such as for example, PFA, PVDF, etc., can be provided. The mixture can additionally contain from 10 to 60 percent by volume of a filler. It has proven to be particularly advantageous if the mixture contains 10 to 30 percent by volume of a metallic filler, preferably in the form of lead. Ten to 30 percent by volume of the mixture can also be made up of a fibrous filler.

The low mass per unit area of the metal/plastic composite plain bearing material forming the bush proves to be especially advantageous, being between 0.19 and 0.77 g/cm$^2$ at a wall thickness of 0.75 mm to 3.0 mm. It must be pointed out that a metal/plastic plain bearing material, as it was described previously, is regarded independently as such as the basis of the invention.

BRIEF DESCRIPTION OF THE DRAWING

Additional details, properties and advantages of the invention become evident from the presentation in the drawings and the subsequent description of components and production method for a rolled-up plain bearing bush according to the invention. In the drawing:

FIG. 1 shows a plan view of a stretched mesh strip for producing the plain bearing bush according to the invention;

FIG. 2 shows a cross-sectional view of the stretched mesh strip from FIG. 1, viewed in the direction of the arrows II—II;

DETAILED DESCRIPTION

Figure 3:
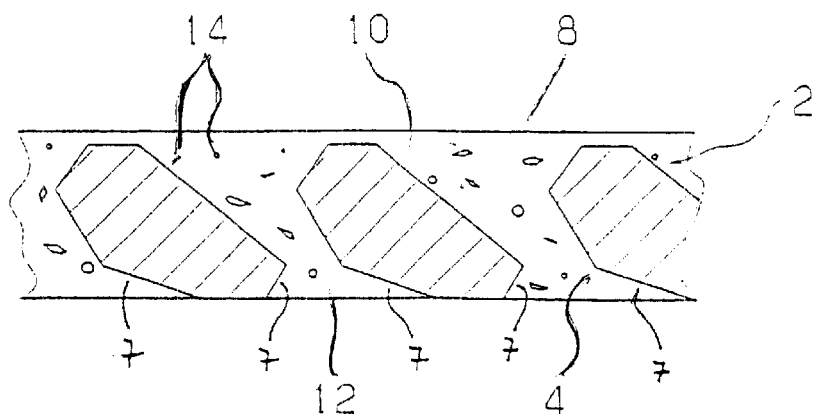
FIG. 3 shows a schematic cross-sectional view of a sliding layer.

FIGS. 1 and 2 show a plan view of a stretched mesh strip 2 or an stretched metal mesh strip, which is preferably used for the subsequently described production of the plain bearing bush in accordance with the invention.

The stretched mesh strip is made of AlMg3 alloy and comprises regularly spaced perforations 4 which are produced by stamping cuts and "stretching" the strip in the direction of arrow 5 by applying tensile force. The structure of the stretched mesh strip 2 or of the connecting material 6 forming the strip, and which border the perforations 4, can be seen from FIG. 2. Preferred dimensions can be found in the table below.

| | |
|---|---|
| Material thickness | a = 0.46 to 0.50 mm |
| Grid width | b = 1.17 mm ± 0.05 mm |
| Height of remaining material | c = ≧0.40 mm |
| Hole gauge dimension | d = 0.25 ± 0.05 mm |
| Thickness of remaining material | s = 0.45 ± 0.10 mm |
| Grid length | L = 0.90 ± 0.10 mm |
| Grid distribution | T = 2.00 ± 0.05 mm |

The stretched mesh strip has undercuts 7 in the direction of material thickness (a), which result in outstanding retention of an impregnated plastic sliding material.

FIG. 3 shows a schematic cross-sectional view of a sliding layer identified in its entirety with the reference numeral 8 for producing a rolled-up bush in accordance with the invention. The sliding layer 8 is formed from the stretched mesh strip 2, which is "filled" with a mixture 10 composed of a plastic sliding material 12 and fillers 14 in such a way that the mixture completely fills the apertures 4 in the stretched mesh strip 2 and, at least on the sliding contact side, forms a projection above the stretched mesh strip 2. As a result of the undercuts 7, the plastic sliding material is retained on the stretched mesh strip 2 without any indication of separation during operation.

To produce the metal/plastic composite plain bearing material, the sliding layer 8 is bonded by means of a relatively thin layer of PFA 16 to a backing 18 of aluminum alloy, preferably of wrought aluminum alloy, by melting on the PFA layer at temperatures between 360° and 380°. This is performed preferably by a double-wall press in which the three layers pass between two endless steel belts running over pressure rollers, and which includes a heating device to heat the composite to at least 360°.

Figure 4:
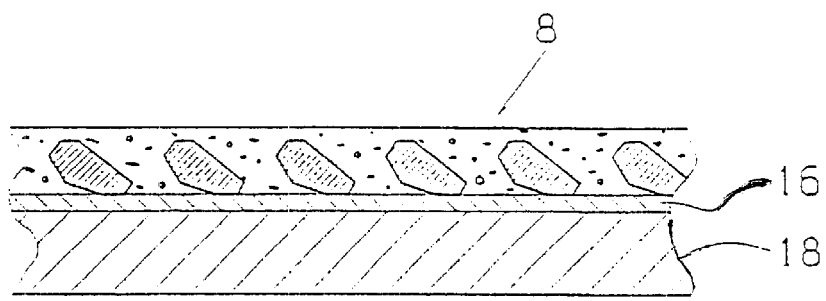
FIG. 4 shows a schematic cross-sectional view of a composite plain bearing bush with the sliding layer from FIG. 3.
Figure 5:
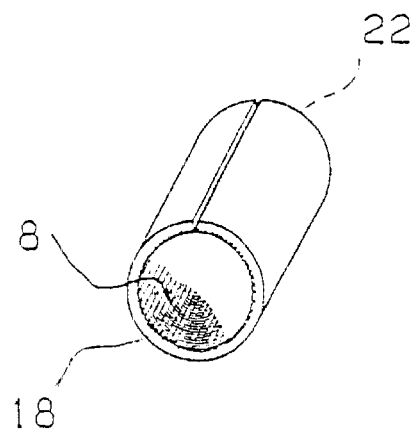
FIG. 5 shows an isometric representation of a rolled-up plain bearing bush in accordance with the invention.

FIG. 4 shows a schematic cross sectional view of the composite plain bearing material 20 obtained in this way. Finally, FIG. 5 shows a schematic view of a rolled-up bush 22 of the composite bearing material 20 from FIG. 4.

Furthermore, comparative measurements of the mass per unit area of a known composite bearing material and the composite bearing material in accordance with the invention were carried out. In the case of the known composite plain bearing material, this involves the Permaglide P10 material described at the beginning, which consists of a 0.75 mm-thick steel backing and 0.25 mm-thick porous lead-bronze applied on top of it and of a plastic sliding layer of PTFE, which coats the lead-bronze to a thickness of 0.02 mm, so that the total material thickness is 1 mm. The material according to the invention on the other hand comprises a 0.55 mm-thick AlMg3 backing. The sliding layer applied to it is formed from 0.40 mm-thick stretched mesh, whose plastic filling has a 0.05 mm-thick excess extending above the side facing the matching sliding contact surface. The bearing material similarly comes to 1.0 mm in thickness. The mass per unit area of the known friction material of 0.76 g/cm$^2$ is almost three times as high as that of the bearing material according to the invention at 0.27 g/cm$^2$.

| | |
|---|---|
| Comparative measurement: | "Mass per unit area" |
| P10, thickness 1.0 mm: | 0.76 g/cm$^2$ |
| New material, thickness 1.0 mm: | 0.27 g/cm$^2$. |

What is claimed is:

1. A rolled-up bearing bush of a metal/plastic composite bearing material with a wall thickness of at least 0.75 mm, which can be pressed into a bearing opening to form a force fit, with a metal backing and a sliding layer, characterized in that the metallic backing consists of aluminum alloy and the sliding layer consists of a section of a stretched mesh strip consisting of aluminum alloy and of a mixture of a plastic sliding material and of fillers as required to improve thermal conductivity and tribological properties, which is introduced onto the section of stretched mesh strip and into the openings of the sections of the stretched mesh strip, and that the sliding layer and the backing are bonded by means of an additional layer of PFA located between them.

2. The rolled-up bush in accordance with claim 1, wherein 30–90 percent by volume of the mixture comprises PTFE as plastic sliding contact material.

3. The rolled-up bush in accordance with claim 2, wherein the mixture comprises 10–60 percent by volume of filler.

4. The rolled-up bush in accordance with claim 3, wherein 10–30 percent by volume of the mixture comprises a metallic filler.

5. The rolled-up bush in accordance with claim 4, wherein the metallic filler is lead.

6. The rolled-up bush in accordance with claim 3 wherein 10–30 percent by volume of the mixture comprises a fibrous filler.

7. The rolled-up bush in accordance with claim 1, wherein the mass per unit area of the metal/plastic composite bearing material is between 0.19 g/cm$^2$ and 0.77 g/cm$^2$ with a wall thickness of 0.75 mm to 3.0 mm.

8. The rolled-up bush in accordance with claim 1, wherein the thickness of the backing layer is from 0.4 to 0.6 mm.

9. The rolled-up bush in accordance with claim 1 wherein the thickness of the sliding layer is 0.3–5 mm.

10. The rolled-up bush in accordance with claim 9, wherein the thickness of the sliding layer is 0.4–5 mm.

* * * * *